United States Patent [19]
Schmid

[11] Patent Number: 5,887,249
[45] Date of Patent: Mar. 23, 1999

[54] METHOD AND APPARATUS FOR REMOTELY ESTABLISHING A CELLULAR SERVICE ACCOUNT FOR A CELLULAR RADIOTELEPHONE

[75] Inventor: Glen H. Schmid, Baie D'urfe, Canada

[73] Assignee: Telefonaktiebolaget L M Ericsson, Sweden

[21] Appl. No.: 594,724

[22] Filed: Jan. 31, 1996

[51] Int. Cl.⁶ ................................................. H04Q 7/38
[52] U.S. Cl. ........................................ 455/411; 379/91.1
[58] Field of Search ...................... 455/411, 89; 380/23; 379/91.1

[56] References Cited

U.S. PATENT DOCUMENTS

| | | | |
|---|---|---|---|
| 4,593,155 | 6/1986 | Hawkins | 455/88 |
| 4,817,190 | 3/1989 | Comroe et al. | 455/11 |
| 4,864,599 | 9/1989 | Saegusa et al. | 379/61 |
| 4,910,510 | 3/1990 | Davis et al. | 340/825.44 |
| 5,020,091 | 5/1991 | Krolopp et al. | 379/58 |
| 5,046,082 | 9/1991 | Zicker et al. | 379/59 |
| 5,109,403 | 4/1992 | Sutphin | 379/59 |
| 5,179,373 | 1/1993 | John | 340/825.15 |
| 5,212,809 | 5/1993 | Oka | 455/54.1 |
| 5,297,191 | 3/1994 | Gerszberg | 379/59 |
| 5,297,192 | 3/1994 | Gerszberg | 379/59 |
| 5,301,223 | 4/1994 | Amadon et al. | 379/58 |
| 5,301,233 | 4/1994 | Amadon et al. | |
| 5,381,138 | 1/1995 | Stair et al. | 340/825.44 |
| 5,386,455 | 1/1995 | Cooper | 379/58 |
| 5,485,505 | 1/1996 | Norman et al. | 379/91 |
| 5,544,225 | 8/1996 | Kennedy, III et al. | 379/59 |
| 5,603,084 | 2/1997 | Henry et al. | 455/89 |
| 5,613,214 | 3/1997 | Shirasawa et al. | 455/411 |
| 5,615,267 | 3/1997 | Lin et al. | 380/23 |
| 5,668,875 | 9/1997 | Brown et al. | 380/23 |

FOREIGN PATENT DOCUMENTS

| | | |
|---|---|---|
| 0 630 167 A2 | 12/1994 | European Pat. Off. . |
| 2249459 | 5/1992 | United Kingdom . |
| WO 94/30023 A | 12/1994 | WIPO . |
| WO 95/10921 | 4/1995 | WIPO . |
| WO 95/15065 | 6/1995 | WIPO . |
| WO 95/15065 A | 6/1995 | WIPO . |
| WO 95/23487 | 8/1995 | WIPO . |
| WO 96/27270 A | 9/1996 | WIPO . |

OTHER PUBLICATIONS

PCT International Search Report, Jul. 18, 1997.
Southwestern Cellular Service, "Southwestern Bell Cellular Service Description", p. 13, Jan. 1985.
Holley, "The GSM Short Message Service", Jan. 1991.
*Cellular Providers Explore Ways to Thwart PCS Market Efforts,* Advanced Wireless Communications, Oct. 12, 1994.
*CDMA Development Group Defines Instant Activation Process; First of Many Specs to be Developed,* Businesswire (BUSW), Sep. 28, 1994.
Silberg, *ORA System to Speed Cellphone Activation,* HFD, Retailing Home Furnishings, Apr. 11, 1994, p. 148.

*Primary Examiner*—William Cumming
*Attorney, Agent, or Firm*—Myers Bigel Sibley & Sajovec

[57] ABSTRACT

In a method for remotely establishing a cellular service account for a cellular radiotelephone within a cellular system, prompts for user input of account information are generated by the cellular system and sent to the cellular radiotelephone. The cellular radiotelephone provides the prompts for user input of the account information, accepts user input of the account information, and generates a data signal within the cellular radiotelephone in response to the user input of the account information. The cellular radiotelephone sends the data signal from the cellular radiotelephone to the cellular system, and the cellular system stores the account information to establish the cellular service account.

14 Claims, 4 Drawing Sheets

METHOD AND APPARATUS FOR REMOTELY ESTABLISHING A CELLULAR SERVICE ACCOUNT FOR A CELLULAR RADIOTELEPHONE

FIELD OF THE INVENTION

This invention relates to communications systems and methods and more particularly to systems and methods for cellular communications.

BACKGROUND OF THE INVENTION

Currently, most cellular radiotelephones must be manually provided with a cellular service account before the user can place a call, and this usually occurs after purchase. Establishing the account may include the steps of providing the user's account information, such as credit and billing information, to the cellular system; waiting for the cellular system to store this account information and assign a telephone number (Mobile Identification Number); and having a technician program the radiotelephone with the assigned telephone number. This process may take an hour or longer because the cellular system will typically run credit checks and other verifications prior to establishing an account. The process of establishing the account may also be delayed due to a backlog of new accounts. In addition, the telephone must remain with the technician until the phone is programmed. Accordingly, there exists a need in the art for a cellular radiotelephone system wherein the radiotelephone can be purchased and a cellular service account established remotely.

In U.S. Pat. No. 5,297,192, there is disclosed a method and apparatus for remotely programming a mobile data telephone. In this patent, downloading of Number Assignment Module ("NAM") designation parameters to a mobile data telephone set allows service authorization codes and activation to be entered remotely. A cellular mobile user first calls a remote cellular system center to establish a voice communication channel between the mobile data telephone and the center. The modem of the telephone is selectively bridged onto the voice communication channel to achieve data transfer between a source of data located at the remote center and the user's modem.

In U.S. Pat. No. 5,301,223, there is disclosed a method and apparatus for use in a mobile telephone rental system. In this patent, credit card information is communicated between the mobile telephone unit and a Voice Response System for customer registration and remote programming of mobile telephone unit features and NAM settings. Data read from the mobile telephone units are transmitted in variable length, encrypted and error protected Packet Data Units.

PCT International Publication No. WO 95/15065 entitled "Apparatus and Method for Remotely Initiating Operation of a Cellular Telephone" discusses an apparatus for activating a cellular telephone within a cellular communications network. A PCMCIA card interacts with a controller to display required programming information and questions. A user of the cellular telephone inputs responses to questions on a display. The user responses are transmitted to a system administrator at a customer activation center via a mobile telephone switching office in the cellular telecommunications network. More specifically described, a personal computer memory card international association (PCMCIA) card is provided to the user who purchases or rents a cellular telephone. The PCMCIA card is preprogrammed with a series of questions. The PCMCIA card, however, may add expense to the cost of this cellular telephone and may also require a corresponding slot port, thereby increasing the complexity of this telephone.

Notwithstanding the above identified patents, there continues to exist a need in the art for improved methods for remotely establishing a cellular service account for a cellular radiotelephone. In particular, there exists a need for methods for remotely establishing a cellular service account for a cellular radiotelephone which can be easily adapted for use in different cellular service areas having different requirements for establishing accounts.

SUMMARY OF THE INVENTION

It is therefore an object of the present invention to provide an improved method and apparatus for remotely establishing a cellular service account for a cellular radiotelephone after purchase.

It is another object of the present invention to provide a method and apparatus for remotely establishing a cellular service account for a cellular radiotelephone which can be easily adapted for use in different cellular service areas.

These and other objects are provided according to the present invention by a method for remotely establishing a cellular service account for a cellular radiotelephone wherein the cellular system generates prompts for user input of account information which are sent to the cellular radiotelephone over a wireless communications path. Accordingly, different prompts can be generated by different cellular systems and received by the same mass produced radio telephones. Stated in other words, the prompts can be adapted for use in each cellular system without requiring any modification to the radiotelephone. The cellular radiotelephone provides these prompts to the user who then inputs the account information into the radiotelephone. This information is sent as a data signal to the cellular system where the cellular service account is established. Accordingly, no special hardware or software is required to establish the cellular service account, and the account can be established by an untrained user following the prompts generated by the cellular system and provided at the radiotelephone.

In one embodiment, the method includes the steps of generating prompts for user input of account information at the cellular system and sending the prompts to the cellular radiotelephone. The prompts are provided to the user, preferably through a visual display. The user inputs the account information in response to the prompts, and this information is preferably accepted by the radiotelephone through an input device such as a keypad. The cellular radiotelephone generates a data signal in response to the user input of the account information, and sends the data signal to the cellular system. The cellular system stores the account information in memory to establish a cellular service account for the cellular radiotelephone.

The account information may include billing information, service information, the user's name, the user's address, credit information, and other user information which may be required to setup the cellular service account. Individual prompts can be used for each item of information required. These prompts can be sent to the cellular radiotelephone during a single data communication thereby reducing the required "air time." Alternately, the prompts can be sent individually thereby reducing the memory required at the cellular radiotelephone to store the prompts. Similarly, the individual items of account information can be sent to the cellular system in one or multiple data communications.

The cellular system can send the prompts as one or more electronic pages. In particular, the electronic page may comprise an SMS message allowing the use of standard communications protocols. Similarly, the cellular radiotelephone can send the account information as a data signal such as an SMS page.

The cellular radiotelephone may include a programmable memory which is programmed with an initial identification number, and a step of providing the initial identification number to the cellular system may proceed the step of storing the account information in the cellular system. In addition, the step of storing the account information may be followed by the steps of establishing a page to the radiotelephone using the initial identification number to identify the radiotelephone, sending a mobile identification number to the cellular radiotelephone during the page, and reprogramming the programmable memory so that it is programmed with the mobile identification number. Accordingly, the radiotelephone is programmed remotely after establishing the cellular service account. Alternately, the initial identification number may be provided to the cellular system when the account information is sent.

In another embodiment of the present invention, a cellular radiotelephone comprises a receiver for receiving prompts from the cellular system and a means for prompting for user input of account information. Input means accept user input of the account information, and generating means generate a data signal in response to the user input. The data signal is transmitted by a transmitter to the cellular system wherein the account information is stored to establish a cellular service account. This radiotelephone can be mass produced and used in different cellular service areas because each cellular service area may generate its own unique prompts.

The prompts from the cellular system are preferably received as a portion of an electronic page, and this electronic page, may comprise an SMS message. Accordingly, the prompts can be received from a cellular system using conventional transmission protocols. In addition, the data signal can be transmitted to the cellular system as an SMS message.

The cellular radiotelephone may further comprise a programmable memory programmed with an initial identification number, and means for reprogramming the programmable memory in response to receipt of a mobile identification number from the cellular system. Accordingly, the programmable memory can be programmed with the mobile identification number automatically after the cellular service account has been setup.

In yet another embodiment of the present invention, a cellular system comprises means for generating prompts for user input of account information, and a transmitter for sending the prompts to a cellular radiotelephone. A receiver is included for receiving a data signal from the cellular radiotelephone wherein the data signal includes account information generated by the cellular radiotelephone in response to prompts for user input followed by user input of the account information. The cellular system also includes memory means for storing the account information to establish a cellular service account for the cellular radiotelephone.

The methods, radiotelephones, and cellular systems discussed above allow a cellular service account to be established for a cellular radiotelephone without the intervention of a trained technician or the requirement of special hardware or software. Accordingly, the user can purchase a cellular radiotelephone, leave the store, and then set up a cellular account remotely. Furthermore, the generation of the prompts within the cellular system allows a mass produced radiotelephone to be used universally with different cellular service systems having different account set up procedures.

DETAILED DESCRIPTION OF A PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
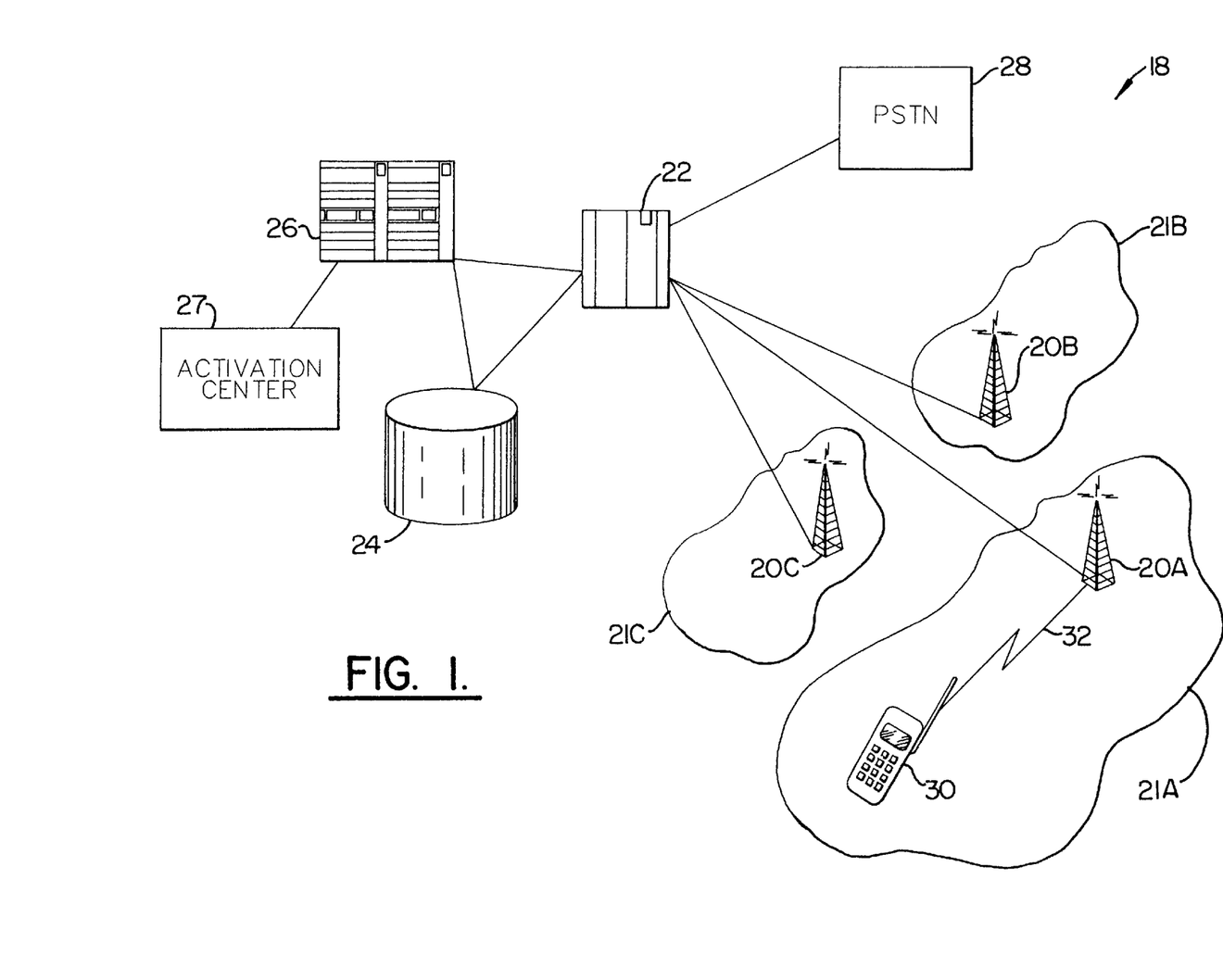
FIG. 1 illustrates a cellular system for remotely establishing a cellular service account for a cellular radiotelephone according to the present invention.

Referring now to FIG. 1, the cellular service provider maintains a cellular system 18 including a plurality of base stations $20_{A-C}$, with each base station defining a respective cell $21_{A-C}$; at least one Mobile Switching Center ("MSC") 22, also known as a mobile telephone switching office; a subscriber data base 24 including a Home Location Register ("HLR") and a Visited Location Register ("VLR"); and a message center 26 which may communicate with an activation center 27. Each of the base stations $20_{A-C}$ preferably conforms to the IS-56B standard, and sends and receives communications to and from the MSC 22 according to proprietary standards. Communications between the MSC 22, the subscriber data base 24, and the message center 26 preferably conform to the IS-41C standard. The IS-41C and IS-56B communications standards will be known to those having skill in the art. Other cellular communications standards may also be used. In addition, the cellular system is preferably connected to a Public Switched Telephone Network ("PSTN") 28 (also known as a land line telephone network) through the MSC 22.

In normal operation, the cellular system 18 provides cellular radiotelephone communications to and from the cellular radiotelephone 30 in a cell of the system. As shown, cellular radiotelephone communications between the radiotelephone 30 and the base station $20_A$ within cell $21_A$ are preferably provided over the wireless communications path 32 according to the IS-136 standard, and the radiotelephone preferably conforms to the IS-55B standard. Accordingly, the cellular system 18 can support radiotelephone communications between the radiotelephone 30 and the PSTN 28 or another radiotelephone.

Briefly, the radiotelephone 30 can be identified by the cellular system 18 by data stored in memory in the radiotelephone. Each radiotelephone includes a programmable memory which contains a unique identification number assigned by the cellular system. This unique identification number is the equivalent of a conventional telephone number, and is preferably a 10 digit number known as the Mobile Identification Number ("MIN"). Because the MIN is assigned by the cellular system, the radiotelephone 30 must be programmed with an MIN of the cellular system's choosing after the phone is purchased and before the radiotelephone can be used. Once the radiotelephone is programmed, the MIN is used by the cellular system to route calls to the phone and to keep track of account information relating to the radiotelephone. When a typical radiotelephone is manufactured, the programmable memory does not contain meaningful data.

Each radiotelephone also includes a non-programmable memory which contains a unique telephone serial number. This serial number can also be used to identify the telephone, and is preferably the Electronic Serial Number ("ESN"). The ESN for each phone is stored in the non-programmable memory when the radiotelephone is manufactured. The ESN is an 11 digit number required by the FCC which identifies the manufacturer of the radiotelephone and the model, as well as providing a unique serial number for the radiotelephone.

Figure 2:
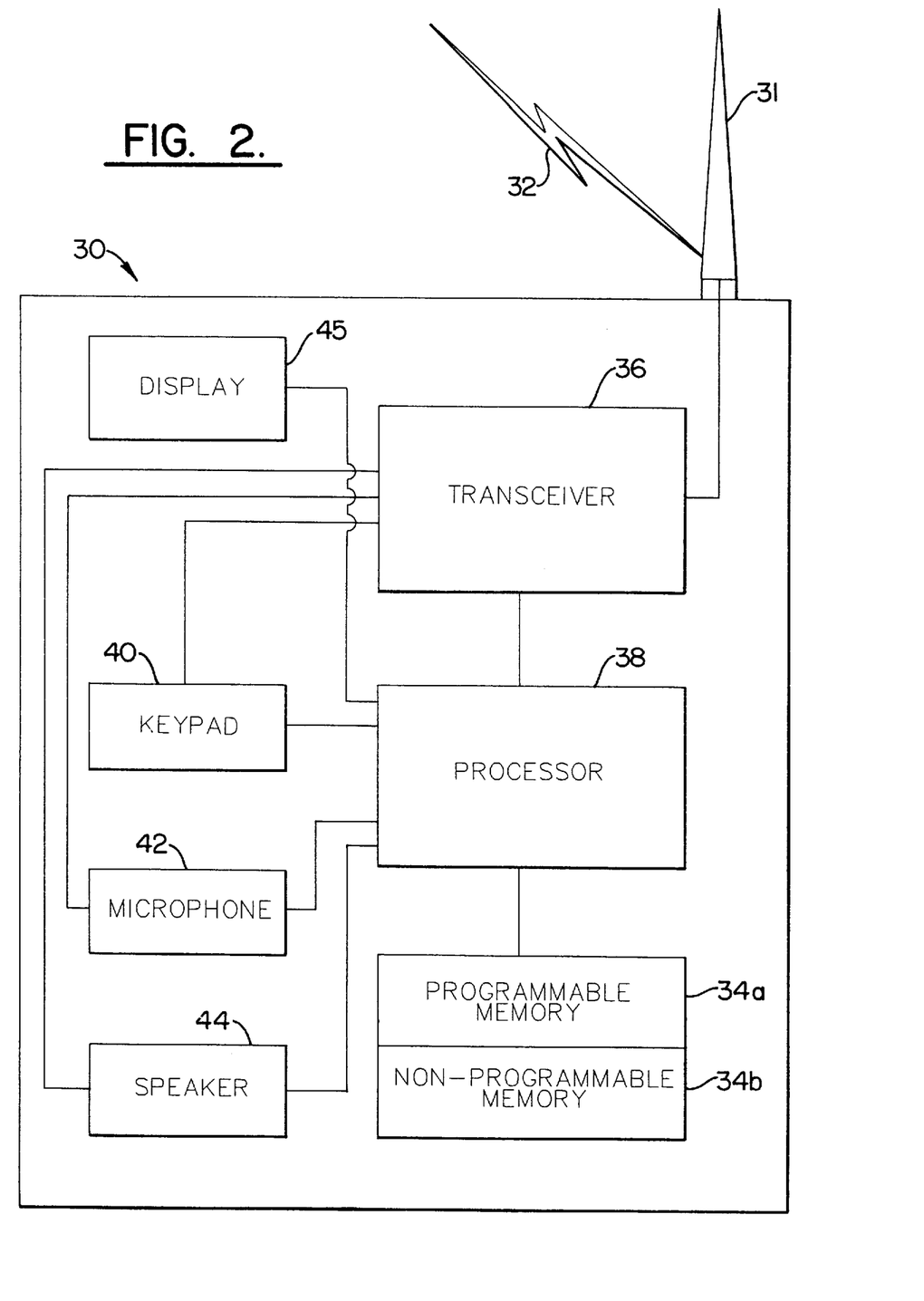
FIG. 2 illustrates a cellular radiotelephone according to the system of FIG. 1.

In one embodiment, the radiotelephone 30 of the present invention includes a memory, including a programmable memory $34_A$ and a non-programmable memory $34_B$, as shown in FIG. 2. The ESN for the radiotelephone is preferably stored in the non-programmable memory $34_B$ when the radiotelephone is manufactured. In the most preferred embodiment, the least significant 10 digits of the ESN are stored in a portion of the programmable memory $34_A$ when the radiotelephone is manufactured, and the resulting number is known as the initial identification number. As will be understood by those having skill in the art, other numbers may be used for the initial identification number as long as each manufactured phone has a relatively unique initial identification number. This programmable memory $34_A$ can later be programmed with an MIN designated by a cellular system.

The radiotelephone also includes a transceiver 36 for transmitting and receiving cellular radiotelephone communications signals to and from a base station. The cellular communications signals are transmitted and received from the antenna 31 over the wireless communication path 32 and preferably conform to IS-136 standards. A processor 38 may control the operation of the radiotelephone and provide an interface between the other elements of the radiotelephone. The radiotelephone may also include a keypad 40, a microphone 42, a speaker 44, and a display 45.

The processor 38 preferably includes a memory programming function for programming the programmable memory $34_A$ in response to receipt of an MIN from the transceiver 36. Accordingly, the radiotelephone 30 can be activated or programmed remotely in response to cellular radiotelephone communication signals generated by the cellular system. The cellular system transmits cellular communication signals including the initial identification number so that the radiotelephone knows to accept the communication including programming information. The communication signals also include the desired MIN, chosen by the cellular system, which is received by the transceiver 36 and written into the programmable memory $34_A$ by the processor 38. These communication signals may be transmitted by the cellular system in the form of a page which is received by the transceiver. The page preferably comprises a Short Message Service ("SMS") data string provided on a Digital Control Channel ("DCC") according to the TIA/EIA IS-136 standard. Accordingly, the SMS data string may include up to 239 octets (or bytes) which can be formatted as characters of alpha-numeric data.

The process of establishing a cellular service account and activating the cellular radiotelephone may be initiated by the radiotelephone 30 by first initiating a cellular radiotelephone communication to the cellular system. Accordingly, the transceiver 36 may include an activation function for establishing a cellular radiotelephone communication from the radiotelephone 30 to the cellular system before the telephone is programmed. This activation function allows the transceiver 36 to transmit the initial identification number to the cellular system. The cellular system can use the initial identification number to identify the radiotelephone 30 after an account has been established, and the MIN has been chosen, as discussed above. The activation function may also allow the transceiver to transmit the ESN to the cellular system.

The cellular radiotelephone communication used to initiate the activation process can be established by manually dialing a predetermined telephone number from the radiotelephone. Alternately, the radiotelephone communication can be automatically initiated by the radiotelephone at the initial power up. For example, a boolean variable in a programmable memory can be used to indicate that the radiotelephone is in a programmed or unprogrammed state. If the boolean variable indicates that the radiotelephone has not been programmed, the radiotelephone automatically establishes a cellular radiotelephone communication, using a previously stored activation number, to initiate the activation process when turned on or when the send button is pressed. This approach allows the phone to be activated with reduced user intervention. The communication can also be initiated by pressing a predetermined key or combination of keys on the key pad 40.

In order to establish a cellular service account, account information (such as billing information, service information, the user's name, the user's address, credit information, and other user information) is preferably provided to the cellular system. Accordingly, the cellular radiotelephone prompts the user for input of the account information and then accepts the account information input by the user. Preferably, the prompts are displayed visually on display 45 and the account information is accepted through keypad 40.

The prompts are generated by the cellular system and sent to the cellular radiotelephone. These prompts can be sent as a single data signal or separate data signals. In each of the above mentioned embodiments, information sent to the cellular system, and prompts sent to the cellular radiotelephone can be sent as pages such as SMS messages allowing this radiotelephone to operate according to conventional protocols.

If the prompts for user input of account information are sent from the cellular system to the radiotelephone in a single page, the total air time required to send the prompts can be reduced. These prompts can be received by the radiotelephone, stored in memory, and displayed to the user one at the time. In response to the display of each prompt, the user inputs the requested information using the keypad. Each item of information can be sent to the cellular system as it is input or stored and sent during a single transmission. Sending the information as it is input can further reduce the memory required in the radiotelephone, while sending a single transmission to the cellular system can reduce the total "air time" required to send this information.

If the prompts are sent from the cellular system to the radiotelephone as separate data signals, the memory in the cellular radiotelephone can be reduced. This reduction in memory can be achieved because there is no need to store all of the prompts. Accordingly, a prompt for a single item of information can be sent to the radiotelephone and the information input by the user can be returned without storing multiple prompts or multiple items of input information.

The radiotelephone of the present invention has the advantage that it allows a cellular service account to be established remotely without requiring special hardware or software or a trained technician. The radiotelephone need only support reception of pages from the cellular system, the display of prompts for information, user input of information, and transmission of the information to the cellular system. Accordingly, a radiotelephone which can send and receive pages and which includes an LCD display and a keypad can provide these functions. The cellular system in turn supports the generation of the prompts and the processing of the information. Accordingly, different cellular systems can accommodate different account procedures using the same mass produced cellular radiotelephones.

Figure 3:
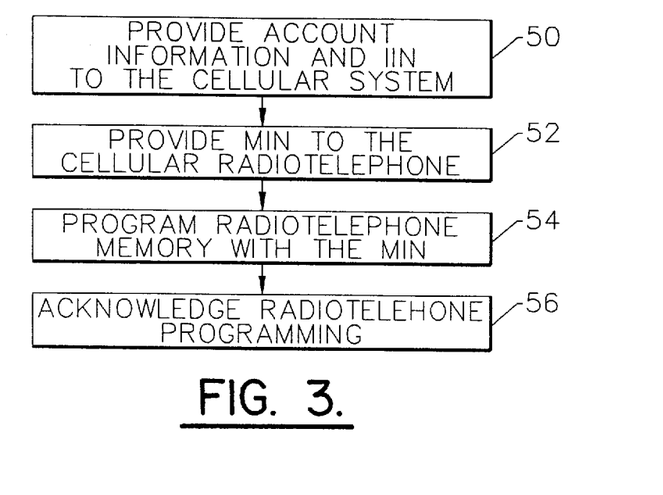
FIG. 3 is a flowchart which illustrates operations for remotely establishing a cellular service account for a cellular radiotelephone according to the present invention.

Referring to FIG. 3, operations for establishing a cellular account and activating a radiotelephone 30 by remote programming are shown in flowchart form. This radiotelephone 30 has a programmable memory $34_A$ which is programmed by the manufacturer with a relatively unique initial identification number. The initial identification number may include predetermined digits chosen from the ESN, such as the least significant 10 digits of the ESN.

Figure 4:
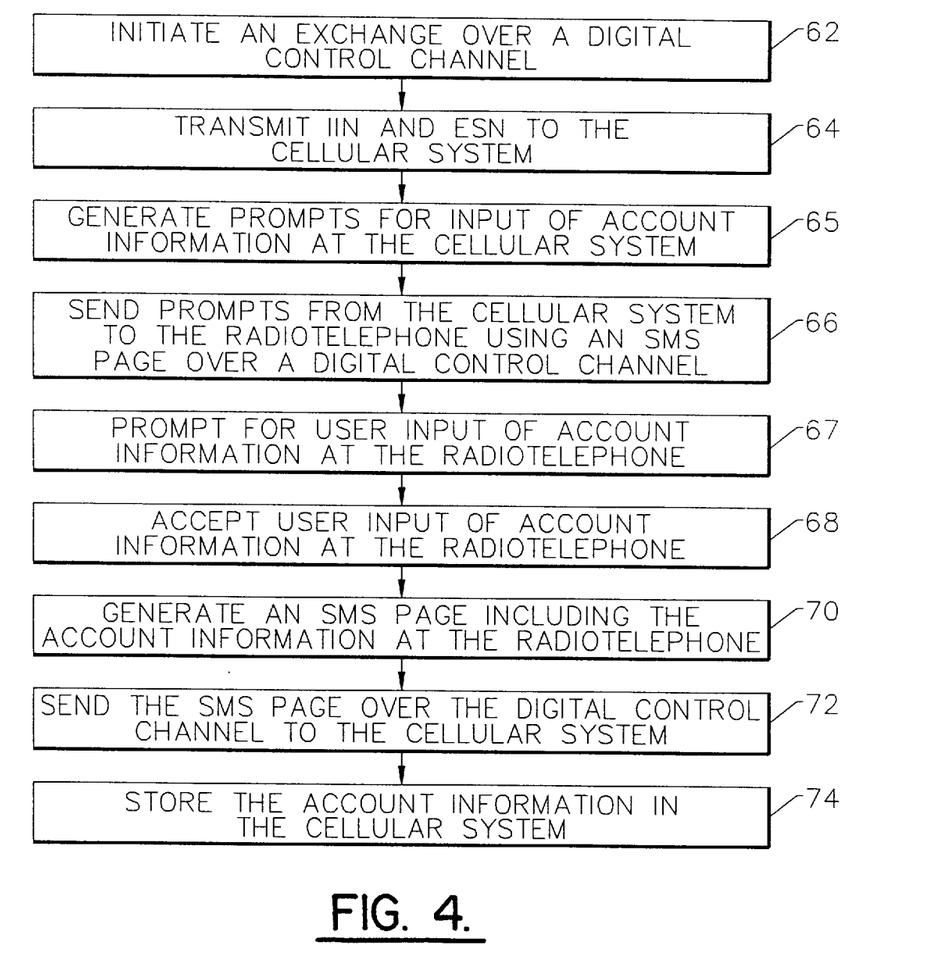
FIG. 4 is a flowchart which illustrates operations for providing information to the cellular system according to FIG. 3.

When phone activation is desired, the account information and the initial identification number ("IIN") are provided at block 50 to the cellular system. Preferably, a first cellular radiotelephone communication is established from the radiotelephone 30 to the cellular system 18, and the initial identification number is transmitted to the cellular system, as shown in FIG. 4. This may be accomplished by initiating an exchange over a digital control channel at block 62 wherein the initial identification number is transmitted at block 64 to the cellular system via the wireless communications path 32 and the base station $20_A$. The ESN may also be transmitted at block 64 over the digital control channel. The ESN may be compared to the initial identification number to insure that the phone has not been previously programmed. The radiotelephone can include a function so that this sequence of events starts automatically the first time the radiotelephone is turned on.

As shown in block 65, the cellular system generates prompts for user input of account information which are sent to the cellular radiotelephone over the wireless communication path. The prompts can be sent from the cellular system to the radiotelephone using one or more electronic pages such as SMS pages over a digital control channel as shown in block 66. If sent as a single page, the total "air time" required can be reduced. If sent as separate pages, the memory required in the radiotelephone can be reduced.

At block 67, the cellular radiotelephone then prompts the user to input account information which can include the user's name, address, credit information, credit card numbers, billing information, service information, etc. The prompts are preferably provided on a visual display such as an LCD display. At block 68, the account information is accepted by the cellular radiotelephone through means such as a keypad.

At block 70, a data signal, such as an SMS page, including the account information is generated by the cellular radiotelephone. This data signal is then sent to the cellular system as an SMS page over a Digital Control Channel at block 72. The account information is stored in the cellular system at block 74. In particular, the Account information can be stored in the Activation Center 27 of the cellular system. As previously discussed, the account information can be sent in separate data signals as the information is input, or the account information can be stored in the cellular radiotelephone until all prompts have been answered and sent as a single data signal. The multiple data signal approach reduces the memory required in the cellular radiotelephone while the single data signal approach reduces the "air time" required to transmit this information.

Because the phone is programmed with the initial identification number, and this number has been provided to the cellular system, the cellular system can call the phone back at a later time to program (or activate) the phone. Accordingly, the user does not have to wait on the phone for the cellular system to establish the account.

The cellular system next determines the MIN and provides the MIN to the radiotelephone at block 52 of FIG. 3. This operation is shown in greater detail in FIG. 5. The cellular system may run automated or manual credit checks and verify account information at block 80. If the cellular system decides to establish an account for the new radiotelephone 30, an MIN is chosen at block 82, and all relevant account information can be stored in the subscriber data base 24. Then, a second cellular radiotelephone communication is established over the wireless communication path 32 from the cellular system to the radiotelephone 30 using the initial identification number to identify the radiotelephone, and the MIN is transmitted to the radiotelephone. This communication is preferably established by initiating an exchange over a DCC at block 84. This cellular communication is preferably a page comprising an SMS data string according to the IS-136 standard.

Figure 5:
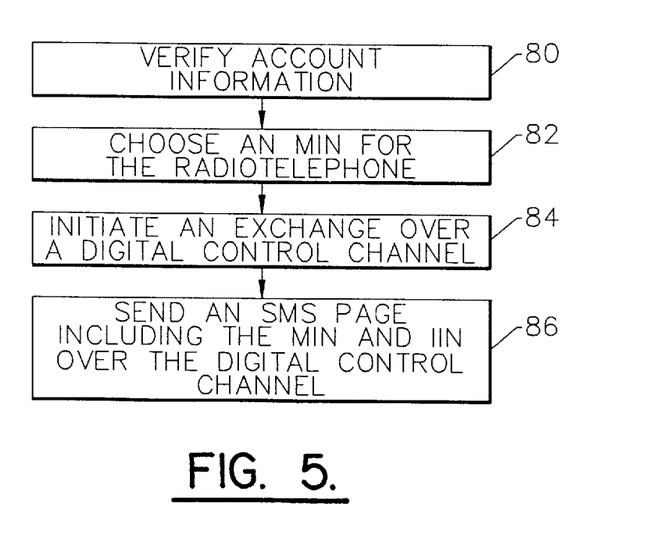
FIG. 5 is a flowchart which illustrates operations for providing an MIN to the radiotelephone according to the present invention.

The SMS page can be provided on the digital control channel and includes the IIN and MIN as shown at block 86. The SMS page may also include any other phone configuration parameters, as well as other Number Assignment Module ("NAM") parameters such as the Public Service ID ("PSID"), the Residential Service ID (RSID"), etc. The SMS page may include up to 293 characters originating from the activation center 26 and transmitted from the base station $20_A$ according to the TIA/EIA IS-136 standard. The transmission of the MIN is discussed in U.S. patent application Ser. No. 08/397,583 entitled "Method And Apparatus For Remotely Programming A Cellular Radiotelephone", the disclosure of which is hereby incorporated in its entirety herein by reference.

The programmable memory is then programmed with the MIN at block 54 in FIG. 3, and the radiotelephone is ready for normal operation. The page is preferably received by the radiotelephone transceiver 36, as discussed above. Data within the page identifies the MIN and signals the processor 38 in the phone to program the programmable memory $34_A$ with the MIN. Methods of remote programming are disclosed, for example, in: U.S. Pat. No. 5,301,223 entitled "Cellular Telephone System with Remote Programming, Voice Responsive Registration and Real Time Billing" to Amadon et al.; U.S. Pat. No. 5,297,192 entitled "Method and Apparatus for Remotely Programming a Mobile Data Telephone Set" to Gerszberg; and PCT International Publication No. WO 95/15065 published Jun. 1, 1995, and entitled "Apparatus and Method for Remotely Initiating Operation of a Cellular Telephone". The disclosures of each of the above mentioned references are hereby incorporated in their entirety herein by reference. The cellular system may wait for a response at block 56 from the radiotelephone 30 indicating successful programming before storing account information in a subscriber database such as a Home Location Register ("HLR") subscriber database. If no response is received, SMS page may be retransmitted.

When the programming step has been completed, the cellular system may automatically initiate a call to the phone to verify proper programming. This call may also be used to indicate to the user that the phone is operational. When the user answers this call, a recorded message may state that the phone is now operational. Alternately, a predetermined signal on the phone such as a tone or a light may indicate that the phone has been programmed. This signal may also be initiated by the page used to program the phone.

The use of these operations eliminates the need to have a technician establish a cellular service account and program a new cellular radiotelephone prior to use. The user can purchase a cellular radiotelephone; remotely establish a cellular service account; and then put the phone away until the page is sent to program the phone. Accordingly, the user does not need to wait for a cellular service account to be established or for the phone to be programmed in order to leave the dealer with the phone after having purchased the phone.

Furthermore, these operations can be implemented using existing cellular system operating standards reducing the need to develop new hardware to support this method of remote programming. The use of an SMS page would be virtually transparent to existing systems.

In a particular embodiment of the method according to the present invention, the radiotelephone 30 initiates a call to the cellular system using a predetermined activation number to access the activation center. In this embodiment, the activation center and the message center are separate units within the cellular system which are linked by a communications line. For example, an X.400 protocol running on top of a Transmission Control Protocol/Internet Protocol ("TCP/IP") or an asynchronous dialup connection can be used. Alternately, the activation center and message center can be implemented in a single unit. The activation number allows an un-programmed radiotelephone to access the activation center. The radiotelephone 30 first accesses a base station $20_A$ on a DCC. Identification numbers and other data from the memory of the radiotelephone may be transmitted to the cellular system over the DCC, allowing the cellular system to compare the ESN and initial identification number to verify that the phone has not been previously programmed.

In an un-programmed radiotelephone 30 according to the present invention, the initial identification number comprises predetermined digits of the ESN and is stored in the programmable memory in which the MIN will later be programmed. In addition, a flag may be set in another programmable memory to indicate that the radiotelephone has not been programmed. Accordingly, the cellular system can determine whether to allow access to the activation center. In addition, the cellular system can determine whether any previous attempts have been made to program a radiotelephone using the initial identification number. Any previous attempts may be disregarded.

Communications are then established between the un-programmed phone and the activation center. If an Integrated Services Digital Network ("ISDN") User Part ("ISUP") is used to trunk the call, some combination of the Numbering Plan Area (area code) ("NPA-NXX") and MIN/ESN or the Mobile Switching Center Identification ("MSCID") and the MIN/ESN are used for the calling party number field. Otherwise, the Feature Group D, Account Number Identification ("FG-D ANI") field is used to convey the user's address. Interactive voice response units combined with live operators may prompt the user to enter required account information. Once the information has been entered, the call is terminated.

After validating the account information supplied by the user over the radiotelephone and choosing a MIN for the radiotelephone, the activation center submits a short (prioritized) message to the local message center. This short message may be submitted by either a dial-up asynchronous connection or X.400 transaction. The short message encapsulates Number Assignment Module ("NAM") program elements including the assigned MIN on the SMS teleservice level. The user's initial identification number received at the activation center is passed as the dialed digits for the submitted short message.

If the activation center saved the Mobile Switching Center Identification ("MSCID") identifying the MSC from which the radiotelephone 30 called, the message center may route the short message as an SMS page directly back to that base station. Alternately, the message center may route the SMS page to every base station in the cellular system. Accordingly, the radiotelephone can be programmed even if the phone is moved from the cell in which it was located when the call was placed to the activation center. If a base station transmits a page and the radiotelephone does not respond, this information can be relayed to the activation center.

When an SMS page is received by a base station from the message center, the base station will transmit the SMS page with the initial identification number to identify the radiotelephone to be programmed and the assigned MIN to be programmed. The assigned MIN may be transmitted as an R-Data portion of the SMS page. If the radiotelephone successfully receives the SMS page and programs the MIN portion into the appropriate programmable memory, the radiotelephone may transmit a response indicating that the programming was successful. This response can be transmitted from the base station back to the activation center, where commands can be initiated to save the account information for the successfully programmed radiotelephone in the HLR portion of the subscriber data base 24. The transmission of the response from the base station back to the activation center can be accomplished according to the TIA/EIA IS-41C standard.

In this embodiment, autonomous terminal registration may be disabled for the radiotelephone being programmed from the time that the SMS page is transmitted from the base station to the time that the account information is programmed in the HLR. Accordingly, the base station can handle the page to the un-programmed radiotelephone.

In addition, a flag in a programmable memory of the radiotelephone may be set to indicate that the phone has been programmed for use with a cellular system. Accordingly, if the attempted programming is unsuccessful, the programming may be re-initiated, and the flag will indicate that the phone has not yet been programmed. The flag may comprise a programmable memory in the radiotelephone which is programmed to a first boolean value when the phone is manufactured to indicate that the phone has not been programmed, and which is programmed to a second boolean value by the processor within the radiotelephone to indicate that the radiotelephone has been successfully programmed.

In addition, the use of E212 addresses or optional sub-address capabilities may simplify the method by allowing more digits for both routing and uniquely identifying the radiotelephone. Optionally, the dialed digit (called party) field can be used on the air-interface to convey more information about the desired call routing. Furthermore, digits can be added to the initial identification number. This can be done by using a non-assigned Numbering Plan Area ("NPA") value.

Alternately, the HLR of the subscriber database can be involved at the beginning. The first communication from the radiotelephone to the cellular system can trigger an interrogation of the HLR which then compares the ESN and the initial identification number to determine if programming is required. Furthermore, Intelligent Network ("IN") concepts can be used to initiate the programming method.

In the drawings and specification, there have been disclosed typical preferred embodiments of the invention, and although specific terms are employed, they are used in a generic and descriptive sense only and not for purposes of limitation, the scope of the invention being set forth in the following claims.

That which is claimed:

1. A method for remotely establishing a cellular service account for a cellular radiotelephone within a cellular system, said method comprising the steps of:

said cellular system generating prompts for user input of account information;

said cellular system sending said prompts to said cellular radiotelephone, wherein said prompts are sent as an electronic page;

said cellular radiotelephone providing said prompts for user input of said account information;

said cellular radiotelephone accepting user input of said account information;

said cellular radiotelephone generating a data signal within said cellular radiotelephone in response to said user input of said account information, said data signal including said account information;

said cellular radiotelephone sending said data signal from said cellular radiotelephone to said cellular system; and said cellular system storing said account information to establish said cellular service account.

2. A method according to claim 1 wherein said electronic page comprises an SMS message.

3. A method for remotely establishing a cellular service account for a cellular radiotelephone within a cellular system, said method comprising the steps of:

said cellular system generating prompts for user input of account information;

said cellular system sending said prompts to said cellular radiotelephone;

said cellular radiotelephone providing said prompts for user input of said account information;

said cellular radiotelephone accepting user input of said account information;

said cellular radiotelephone generating a data signal within said cellular radiotelephone in response to said user input of said account information, said data signal including said account information;

said cellular radiotelephone sending said data signal including said account information from said cellular radiotelephone to said cellular system wherein said cellular radiotelephone sending step comprises sending said data signal as an SMS message; and said cellular system storing said account information from said data signal to establish said cellular service account.

4. A method according to claim 1 wherein:

said cellular radiotelephone includes a programmable memory which is programmed with an initial identification number;

said cellular system storing step is proceeded by the step of providing said initial identification number to said cellular system; and said cellular system storing step is followed by the steps of said cellular system establishing a page to said cellular radiotelephone using said initial identification number to identify said cellular radiotelephone, said cellular system sending a mobile identification number to said cellular radiotelephone during said page, and said cellular radiotelephone reprogramming said programmable memory so that said programmable memory is programmed with said mobile identification number.

5. A method according to claim 1 wherein:

said cellular radiotelephone includes a programmable memory which is programmed with an initial identification number;

said cellular radiotelephone sending step further comprises providing said initial identification number to said cellular system; and said storing step is followed by the steps of said cellular system establishing a page to said cellular radiotelephone using said initial identification number to identify said cellular radiotelephone, said cellular system sending a mobile identification number to said cellular radiotelephone during said page, and said cellular radiotelephone reprogramming said programmable memory so that said programmable memory is programmed with said mobile identification number.

6. A cellular radiotelephone for operation in a cellular system, said cellular radio telephone comprising:

a receiver for receiving prompts for user input of account information from said cellular system, wherein said prompts from said cellular system are received as a portion of an electronic page;

prompting means for prompting for user input of said account information;

input means for accepting user input of said account information;

generating means for generating a data signal in response to said user input of said account information, said data signal including said account information; and a transmitter for transmitting said data signal from said cellular radiotelephone to said cellular system wherein said account information is stored to establish a cellular service account.

7. A cellular radiotelephone according to claim 6 wherein said electronic page comprises an SMS message.

8. A cellular radiotelephone for operation in a cellular system, said cellular radio telephone comprising:

a receiver for receiving prompts for user input of account information from said cellular system;

prompting means for prompting for user input of said account information;

input means for accepting user input of said account information;

generating means for generating a data signal in response to said user input of said account information, said data signal including said account information; and a transmitter for transmitting said data signal including said account information from said cellular radiotelephone to said cellular system wherein said account information is stored to establish a cellular service account wherein said data signal is transmitted as an SMS message.

9. A cellular radiotelephone according to claim 6 further comprising:

a programmable memory programmed with an initial identification number; and reprogramming means for reprogramming said programmable memory in response to receipt of a mobile identification number from said cellular system so that said programmable memory is programmed with said mobile identification number.

10. A cellular system for providing communications with at least one cellular radiotelephone, said cellular system comprising:

generating means for generating prompts for user input of account information, wherein said prompts for user input of said account information are sent as an electronic page;

a transmitter for sending said prompts for user input of said account information to said cellular radiotelephone;

a receiver for receiving a data signal from said cellular radiotelephone, said data signal including account information generated by said cellular radiotelephone in response to prompts for user input followed by user input of said account information; and memory means for storing said account information to establish a cellular service account for said cellular radiotelephone.

11. A cellular system according to claim 10 wherein said electronic page comprises an SMS message.

12. A cellular system for providing communications with at least one cellular radiotelephone, said cellular system comprising:

generating means for generating prompts for user input of account information;

a transmitter for sending said prompts for user input of said account information to said cellular radiotelephone;

a receiver for receiving a data signal from said cellular radiotelephone, said data signal including account information generated by said cellular radiotelephone in response to prompts for user input followed by user input of said account information wherein said data signal comprises an SMS message; and memory means for storing said account information from said data signal to establish a cellular service account for said cellular radiotelephone.

13. A cellular radiotelephone according to claim 6 further comprising:

a programmable memory programmed with an initial identification number;

a transmitter that transmits said initial identification number to the cellular system wherein the receiver also receives a programming page from the cellular system including said initial identification number to identify the cellular radiotelephone and including a mobile identification number; and reprogramming means for reprogramming said programmable memory so that said programmable memory is programmed with said mobile identification number.

14. A cellular system according to claim 10 wherein the cellular radiotelephone includes a programmable memory which is programmed with an initial identification number, wherein said receiver receives the initial identification number from the cellular radiotelephone, and wherein said transmitter transmits a programming page to the cellular radiotelephone using the initial identification number to identify the cellular radiotelephone said programming page including a mobile identification number so that the cellular radiotelephone can reprogram the programmable memory with the mobile identification number.

\* \* \* \* \*